US010690368B2

(12) United States Patent
Yasufuku et al.

(10) Patent No.: US 10,690,368 B2
(45) Date of Patent: Jun. 23, 2020

(54) INFORMATION PROCESSING APPARATUS AND INFORMATION PROCESSING SYSTEM

(71) Applicant: FUJITSU LIMITED, Kawasaki-shi, Kanagawa (JP)

(72) Inventors: Yoichi Yasufuku, Machida (JP); Mikio Ito, Kawasaki (JP); Hiroshi Shiomi, Kawasaki (JP); Takako Kato, Setagaya (JP); Yasuhito Kikuchi, Kawasaki (JP); Hiroyasu Inagaki, Tachikawa (JP); Yukinori Matsukawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/059,105

(22) Filed: Aug. 9, 2018

(65) Prior Publication Data
US 2019/0056135 A1 Feb. 21, 2019

(30) Foreign Application Priority Data
Aug. 18, 2017 (JP) .................................. 2017-157969

(51) Int. Cl.
*G06F 11/00* (2006.01)
*F24F 11/46* (2018.01)
(Continued)

(52) U.S. Cl.
CPC ............ *F24F 11/46* (2018.01); *G06F 1/3215* (2013.01); *G06F 1/3287* (2013.01);
(Continued)

(58) Field of Classification Search
CPC .. F24F 11/46; F24F 11/62; F24F 11/65; G06F 1/3215; G06F 1/3287;
(Continued)

(56) References Cited

U.S. PATENT DOCUMENTS

| 2003/0145242 A1* | 7/2003 | Derocher | G06F 1/3203 |
| | | | 713/320 |
| 2008/0005461 A1* | 1/2008 | Toda | G06F 1/3221 |
| | | | 711/112 |

(Continued)

FOREIGN PATENT DOCUMENTS

| JP | 06-089146 | 3/1994 |
| JP | 2006-031537 | 2/2006 |

*Primary Examiner* — Anthony J Amoroso
(74) *Attorney, Agent, or Firm* — Fujitsu Patent Center

(57) ABSTRACT

An information processing apparatus includes a memory and a processor coupled to the memory. The memory stores first information and second information. The first information includes a permission time with respect to each of a plurality of operation states of the information processing apparatus in an activation state. The permission time is a time allowed for switching a substitute apparatus from a standby state to the activation state. The second information includes an activation time required for activating each of a plurality of modules which operate on the substitute apparatus. The processor identifies one permission time corresponding to a current operation state. The processor determines stop modules such that a total time for activating the stop modules is equal to or less than the one permission time based on the second information. The processor instructs the substitute apparatus in the standby state to stop the stop modules.

13 Claims, 14 Drawing Sheets

(51) Int. Cl.
*G06F 1/3296* (2019.01)
*G06F 1/3215* (2019.01)
*G06F 1/3287* (2019.01)
*G06F 3/06* (2006.01)
*G06F 9/50* (2006.01)
*G06F 11/20* (2006.01)
*F24F 11/62* (2018.01)

(52) U.S. Cl.
CPC .............. *G06F 1/3296* (2013.01); *G06F 3/06* (2013.01); *G06F 9/5038* (2013.01); *G06F 9/5094* (2013.01); *G06F 11/2033* (2013.01); *F24F 11/62* (2018.01)

(58) Field of Classification Search
CPC ........ G06F 1/3296; G06F 1/32; G06F 1/3203; G06F 1/3206; G06F 1/3234; G06F 1/3246; G06F 3/06; G06F 3/0625; G06F 9/5094; G06F 9/485; G06F 9/50; G06F 9/5038; G06F 11/008; G06F 11/1658; G06F 11/2023; G06F 11/2033; G06F 11/2097
See application file for complete search history.

(56) References Cited

U.S. PATENT DOCUMENTS

| | | | |
|---|---|---|---|
| 2008/0114912 A1* | 5/2008 | Shimizu | A63F 13/02 710/106 |
| 2008/0183654 A1* | 7/2008 | Kimura | G11B 19/10 |
| 2009/0219569 A1* | 9/2009 | Hara | G06F 3/1221 358/1.15 |
| 2009/0249099 A1* | 10/2009 | Saito | G06F 1/3203 713/323 |
| 2011/0007349 A1* | 1/2011 | Takenaka | H04N 1/00885 358/1.15 |
| 2012/0240112 A1* | 9/2012 | Nishiguchi | G06F 9/45558 718/1 |
| 2013/0290763 A1* | 10/2013 | Katsumata | G06F 11/1658 713/330 |
| 2016/0109930 A1* | 4/2016 | Hiraoka | G06F 1/3215 713/320 |
| 2016/0196229 A1* | 7/2016 | Shichi | G06F 15/163 710/316 |
| 2017/0153688 A1* | 6/2017 | Ichikawa | G06F 1/3275 |

* cited by examiner

FIG. 5

| MODULE INFORMATION ||
|---|---|
| MODE CHANGE TIME $T_{E0}$ = 10 SECONDS | POWER CONSUMPTION OF MODE CHANGE $P_{E0}$ = 999 W |
| ACTIVATION TIME OF SW2 $T_{E1}$ = 10 SECONDS | POWER CONSUMPTION OF SW2 $P_{E1}$ = 50 W |
| ACTIVATION TIME OF SW1 $T_{E2}$ = 10 SECONDS | POWER CONSUMPTION OF SW1 $P_{E2}$ = 100 W |
| ACTIVATION TIME OF OS $T_{E3}$ = 30 SECONDS | POWER CONSUMPTION OF OS $P_{E3}$ = 100 W |
| | THRESHOLD VALUE OF POWER CONSUMPTION $P_{TH}$ = 50 W |

132

INFORMATION PROCESSING APPARATUS AND INFORMATION PROCESSING SYSTEM

CROSS-REFERENCE TO RELATED APPLICATION

This application is based upon and claims the benefit of priority of the prior Japanese Patent Application 2017-157969, filed on Aug. 18, 2017, the entire contents of which are incorporated herein by reference.

FIELD

The embodiments discussed herein are related to an information processing apparatus and an information processing system.

BACKGROUND

In an information processing system, it is continuously required to reduce power consumption. For example, in recent years, with the spread of the cloud computing, an aggregation of a server device and a storage device into a data center is in progress. In such a data center, since a short-term improvement of a power facility and an air-conditioning facility is difficult, a demand for power saving of the server device or the storage device increases.

Regarding the technology for reducing the power consumption, the following proposals are made. For example, there has been proposed a drive device that transitions to any one of low power consumption modes each having different power consumption levels according to an operating environment and an operating condition of a host computer. Further, for example, a control method is proposed in which a standby disk included in a disk array device is periodically activated to check an operation, and when it is confirmed that the standby disk is in a normal condition, the standby disk is stopped and put in a standby state.

Meanwhile, as a method for improving a fault tolerance of the information processing system, a method is known in which an information processing apparatus is made redundant such that when one information processing apparatus is activated, the other information processing apparatus is put in a standby state, and when a fault occurs in the information processing apparatus in activation, the information processing apparatus in the standby state is activated to take over the processing.

Related technologies are disclosed in, for example, Japanese Laid-Open Patent Publication No. 2006-031537 and Japanese Laid-Open Patent Publication No. 06-089146.

SUMMARY

According to an aspect of the present invention, provided is an information processing apparatus including a memory and a processor coupled to the memory. The memory is configured to store first information and second information. The first information includes a permission time with respect to each of a plurality of operation states of the information processing apparatus in an activation state. The permission time is a time allowed for switching a substitute apparatus from a standby state to the activation state. The substitute apparatus takes over processing of the information processing apparatus upon transitioning to the activation state. The second information is provided in the substitute apparatus and includes an activation time required for activating each of a plurality of modules which operate when the substitute apparatus is in the activation state. The processor is configured to determine a current operation state of the information processing apparatus in the activation state. The processor is configured to identify one permission time corresponding to the current operation state from among the first information. The processor is configured to determine stop modules among the plurality of modules such that a total time for activating the stop modules is equal to or less than the one permission time based on the second information. The stop modules are modules to be stopped. The processor is configured to instruct the substitute apparatus in the standby state to stop the stop modules.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a diagram illustrating a specific example of module information;

DESCRIPTION OF EMBODIMENTS

As a control method of the information processing system in which the information processing apparatus is made redundant, a method may be considered in which the same modules as hardware or software modules activated in the activated information processing apparatus are all activated as well in the information processing apparatus in the standby state. According to such a method, it is unnecessary to newly activate the module when the information processing apparatus in the standby state is transitioned to an activation state, so it is possible to shorten a time required for switching the information processing apparatus to be in the activation state. However, there is a possibility that a module that does not operate may remain activated in the standby state, and as a result, there is a problem that the power consumption is wasted as much.

Hereinafter, embodiments of the present disclosure will be described with reference to the accompanying drawings.

First Embodiment

Figure 1:
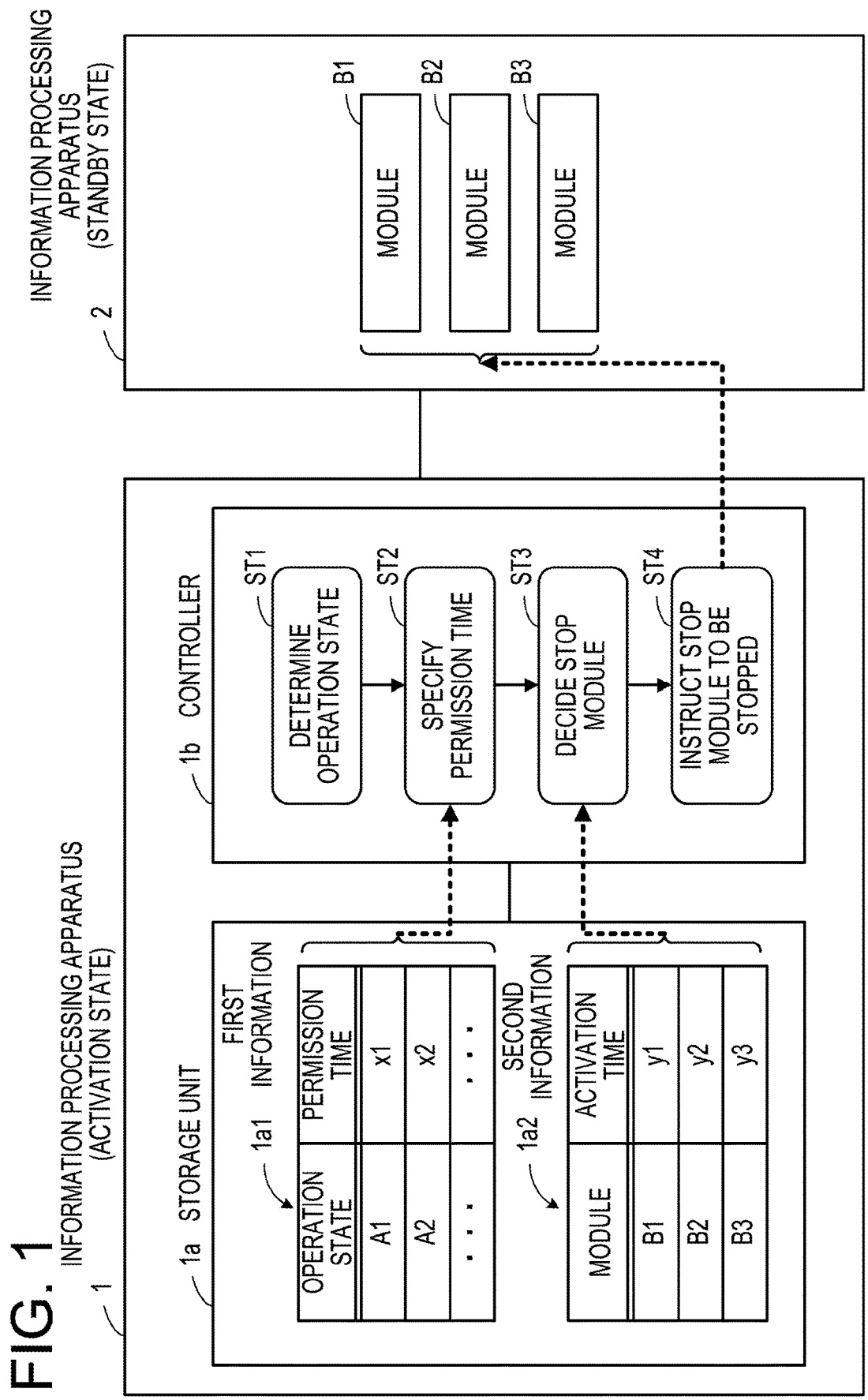
FIG. 1 is a diagram illustrating an example of a configuration and an example of a processing of an information processing system according to a first embodiment.

FIG. 1 is a diagram illustrating an example of a configuration and an example of a processing of an information processing system according to a first embodiment. The information processing system illustrated in FIG. 1 includes information processing apparatuses 1 and 2. One of the information processing apparatuses 1 and 2 becomes an activation state, and the other becomes a standby state. When the information processing apparatus in the standby state is transitioned to the activation state, the information processing apparatus in the standby state takes over the processing of the information processing apparatus that has been in the activation state until then. Further, in the following description, it is assumed that in an initial state, the information processing apparatus 1 is in the activation state and the information processing apparatus 2 is in the standby state.

The storage information apparatus 1 includes a storage unit 1a and a controller 1b. For example, the storage unit 1a is mounted as a storage area of a storage device provided in the information processing apparatus. For example, the controller 1b is mounted as a processor provided by the information processing apparatus 1.

Meanwhile, the information processing apparatus 2 includes modules B1 to B3. Modules B1 to B3 operate when the information processing apparatus 2 becomes in the activation state. Therefore, when each of modules B1 to B3 stops, for example, when the information processing apparatus 2 is in the standby state, it is necessary to activate each of modules B1 to B3 during the processing of switching the information processing apparatus 2 to the activation state.

Further, each of modules B1 to B3 may be a module of hardware or a module of software. In addition, the number of modules provided in the information processing apparatus 2 is not limited to "3" and may be any number of 2 or more.

The storage unit 1a of the information processing apparatus 1 stores first information 1a1 and second information 1a2.

For each of operation states A1, A2, . . . , of the information processing apparatus 1 which is in the activation state, a permission time allowed for switching processing of switching the information processing apparatus 2 from the standby state to the activation state is registered in the first information 1a1. In the example of FIG. 1, permission time x1 is registered for operation state A1 and permission time x2 is registered for operation state A2.

For example, there is a case where an upper limit time at which predetermined processing executed in the information processing apparatus 1 may be stopped is changed depending on the operation state of the information processing apparatus 1. The predetermined processing is a processing in which the information processing apparatus 2 that is transitioned to the operation state takes over from the information processing apparatus 1. As a more specific example, it is conceivable that the predetermined processing is executed in response to a processing request from an external apparatus other than the information processing apparatus 2. In this case, in a state where the processing request from the external apparatus is accepted, in order to reduce an influence exerted on the processing of the external apparatus, the upper limit time during which the predetermined processing may be stopped is shorter than the state in which the reception of the processing request is stopped. Further, for example, depending on the type of error occurring in the information processing apparatus 1 or an occurrence situation of the error, the upper limit time during which the predetermined processing may be stopped may be changed. Therefore, according to the above example, the permission time according to the operation state of the information processing apparatus 1 may be determined based on the upper limit time at which the predetermined processing may be stopped.

An activation time required for activation is registered in the second information 1a2 with respect to each of modules B1 to B3. In the example of FIG. 1, activation time y1 is registered for module B1, activation time y2 is registered for module B2, and activation time y3 is registered for module B3.

The controller 1b executes the following processing when the information processing apparatus 1 is in the activation state.

The controller 1b determines the current operation state of the information processing apparatus 1 (step ST1). The controller 1b specifies a permission time corresponding to the determined current operation state among the permission time registered in the first information 1a1 (step ST2). Based on the second information 1a2, the controller 1b determines a stop module so that a total activation time of the stop module for stopping the operation among modules B1 to B3 is equal to or less than a specified permission time (step ST3).

Then, the controller 1b instructs the information processing apparatus 2 in the standby state to stop the determined stop module (step ST4). In accordance with the instruction, the information processing apparatus 2 controls the module determined as the stop module among modules B1 to B3 to be stopped and the other modules to be in the activation state.

By the above processing, when an event occurs to execute the switching processing for switching the information processing apparatus 2 from the standby state to the activation state, the activation of the stopped module among modules B1 to B3 may be completed within the permission time specified at that time. Then, the information processing apparatus 2 that is transitioned to the activation state may take over the processing that is being executed in the information processing apparatus 1, using activated modules B1 to B3.

As described above, depending on the operation state of the information processing apparatus 1 in the activation state, some or all of modules B1 to B3 may be stopped depending on the above processing of the information processing apparatus 1 within a range not affecting the time required for the switching processing. Therefore, it is possible to reduce the power consumption of the information processing apparatus 2 in the standby state without extending the time required for the switching processing from the permission time.

Second Embodiment

Next, a storage system according to a second embodiment will be described. In the storage system according to the second embodiment, a storage control device is applied as the examples of the information processing apparatuses 1 and 2.

Figure 2:
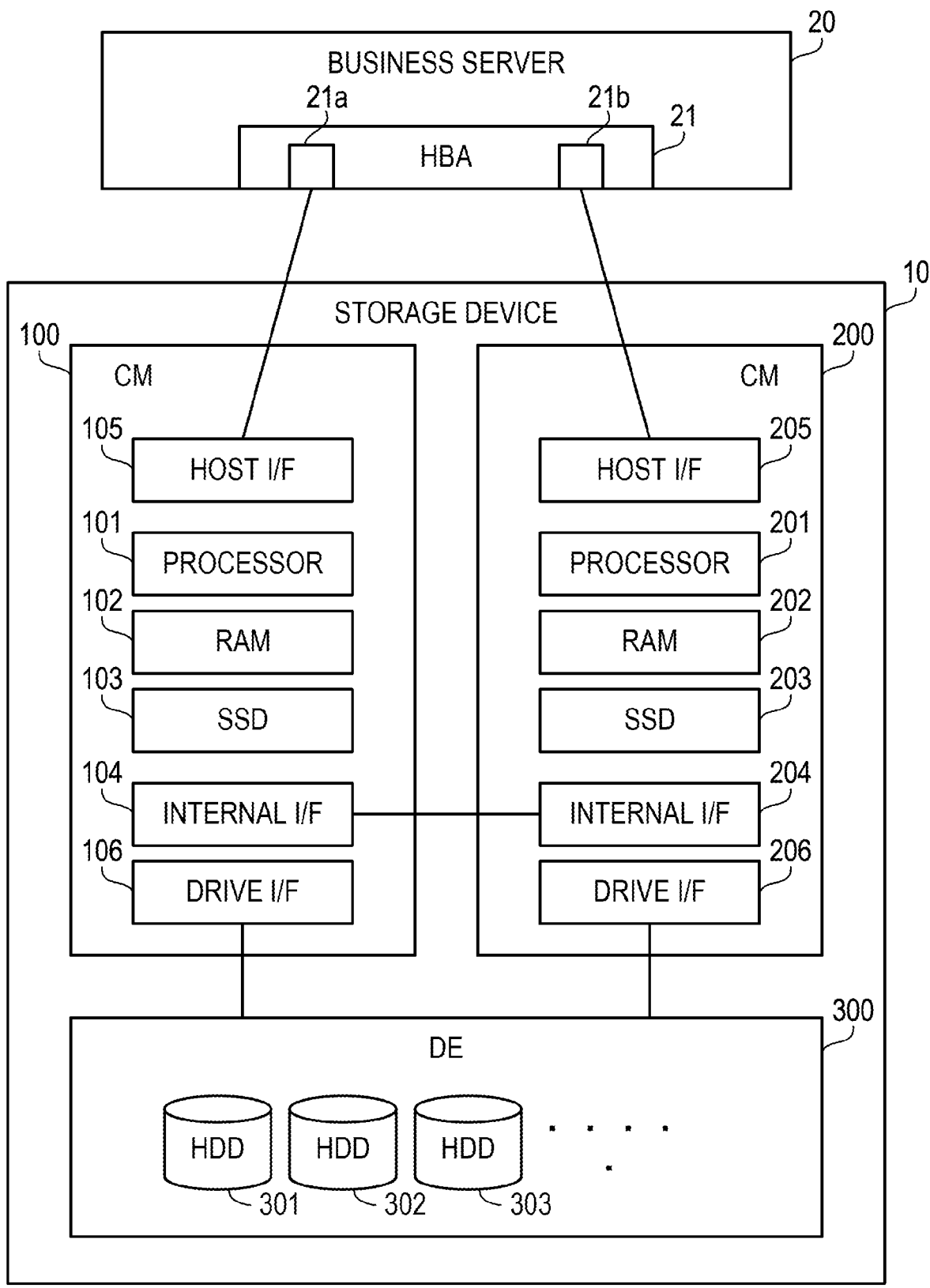
FIG. 2 is a diagram illustrating an example of a configuration of a storage system according to a second embodiment.

FIG. 2 is a diagram illustrating an example of a configuration of a storage system according to a second embodiment. The storage system illustrated in FIG. 2 has a storage device 10 and a business server 20. The storage device 10 includes controller modules (CM) 100 and 200 and a drive enclosure (DE) 300.

The CMs 100 and 200 are storage control devices that control I/O processing for the storage device mounted on the DE 300 in response to an input/output (I/O) request from the business server 20. For example, the CMs 100 and 200 configure logical volumes using storage devices mounted on the DE 300 as physical storage areas and accept the I/O request for the logical volume from the business server 20.

Herein, one of the CMs 100 and 200 operates as the CM which is active (in the activation state) and the other operates as the CM which stands by (is in the standby state). In addition, for example, when the operation of the active CM stops due to, for example, a failure, the other CM transitions from the standby state to the activation state and takes over the processing of the CM that has been active until then.

More specifically, of the CMs 100 and 200, the active CM accepts the I/O request from the business server 20 and controls the I/O processing for the storage device mounted on the DE 300 according to the I/O request. In addition, when the operation of the active CM stops, the standby CM transitions to the activation state and accepts the I/O request from the business server 20 on behalf of the CM that has been active until then.

Further, the CMs 100 and 200 and the business server 20 are connected via a storage area network (SAN) using, for example, a fiber channel (FC) or Internet small computer system interface (iSCSI). In addition, the CM 100 and the CM 200 are connected via a dedicated communication path and are configured to communicate with each other.

A plurality of storage devices to be accessed by the business server 20 is mounted on the DE 300. In the embodiment, as an example, it is assumed that hard disk drives (HDDs) 301, 302, 303, . . . , are mounted in the DE 300 as such storage devices. However, another type of storage device such as a solid state disk (SSD) may be mounted on the DE 300.

The business server 20 is a server computer that executes processing related to various kinds of tasks. Upon execution of the processing, the business server 20 appropriately transmits an access I/O to the storage device to the active CM of the CMs 100 and 200.

The business server 20 includes a host bus adapter (HBA) 21 for communicating with the CMs 100 and 200. The HBA 21 includes a port 21a connected to the CM 100 and a port 21b connected to the CM 200. The business server 20 communicates only with the active CM of the CMs 100 and 200 and when the active CM is changed (that is, when fail-over is performed), a communication target is switched to the other CM.

Further, the change of the communication target by the business server 20 at the time of the fail-over is performed, for example, as follows. A common logical port number is allocated to ports (not illustrated) provided in host interfaces 105 and 205, which are used for communication with the business server 20 and only an active-side port is validated. In addition, when the operation of the active CM stops, a port at a newly activated CM side is validated. As a result, the communication target of the business server 20 is changed without the business server 20 being aware that the active CM is changed.

Next, hardware configuration examples of the CMs 100 and 200 will be described. The CM 100 includes a processor 101, a random access memory (RAM) 102, an SSD 103, an internal interface (I/F) 104, a host interface (I/F) 105, and a drive interface (I/F) 106. The CM 200 includes a processor 201, a RAM 202, an SSD 203, an internal interface (I/F) 204, a host interface (I/F) 205, and a drive interface (I/F) 206.

The processor 101 totally controls the entirety of the CM 100. The processor 101 is, for example, any one of a central processing unit (CPU), a micro processing unit (MPU), a digital signal processor (DSP), an application specific integrated circuit (ASIC), a graphics processing unit (GPU), and a programmable logic device (PLD). Further, the processor 101 may be, for example, a combination of two or more elements among the CPU, the MPU, the DSP, the ASIC, the GPU, and the PLD.

The RAM 102 is a main storage device of the CM 100. The RAM 102 temporarily stores at least a part of a program of an operating system (OS) or an application program executed in the processor 101. Further, the RAM 102 memorizes various data used for the processing by the processor 101. The SSD 103 is a sub storage device of the CM 100. The programs of the OS, the application programs, and various data are stored in the SSD 103. Further, the CM 100 may include the HDD instead of the SSD 103 as the sub storage device.

The internal interface 104 is an interface for communicating with the other CM 200 and is connected to the internal interface 204 of the CM 200. The host interface 105 is an interface for communicating with the business server 20. Therefore, the host interface 105 is connected to the port 21a of the HBA 21 of the business server 20. The drive interface 106 is an interface for communicating with the HDDs 301, 302, 303, . . . , mounted on the DE 300.

Meanwhile, the processor 201, the RAM 202, the SSD 203, the internal interface 204, the host interface 205, and the drive interface 206 of the CM 200 are hardware corresponding to the processor 101, the RAM 102, the SSD 103, the internal interface 104, the host interface 105, and the drive interface 106 of the CM 100, respectively, so that the description thereof will be omitted. Further, the host interface 205 is connected to the port 21b of the HBA 21 of the business server 20.

Figure 3:
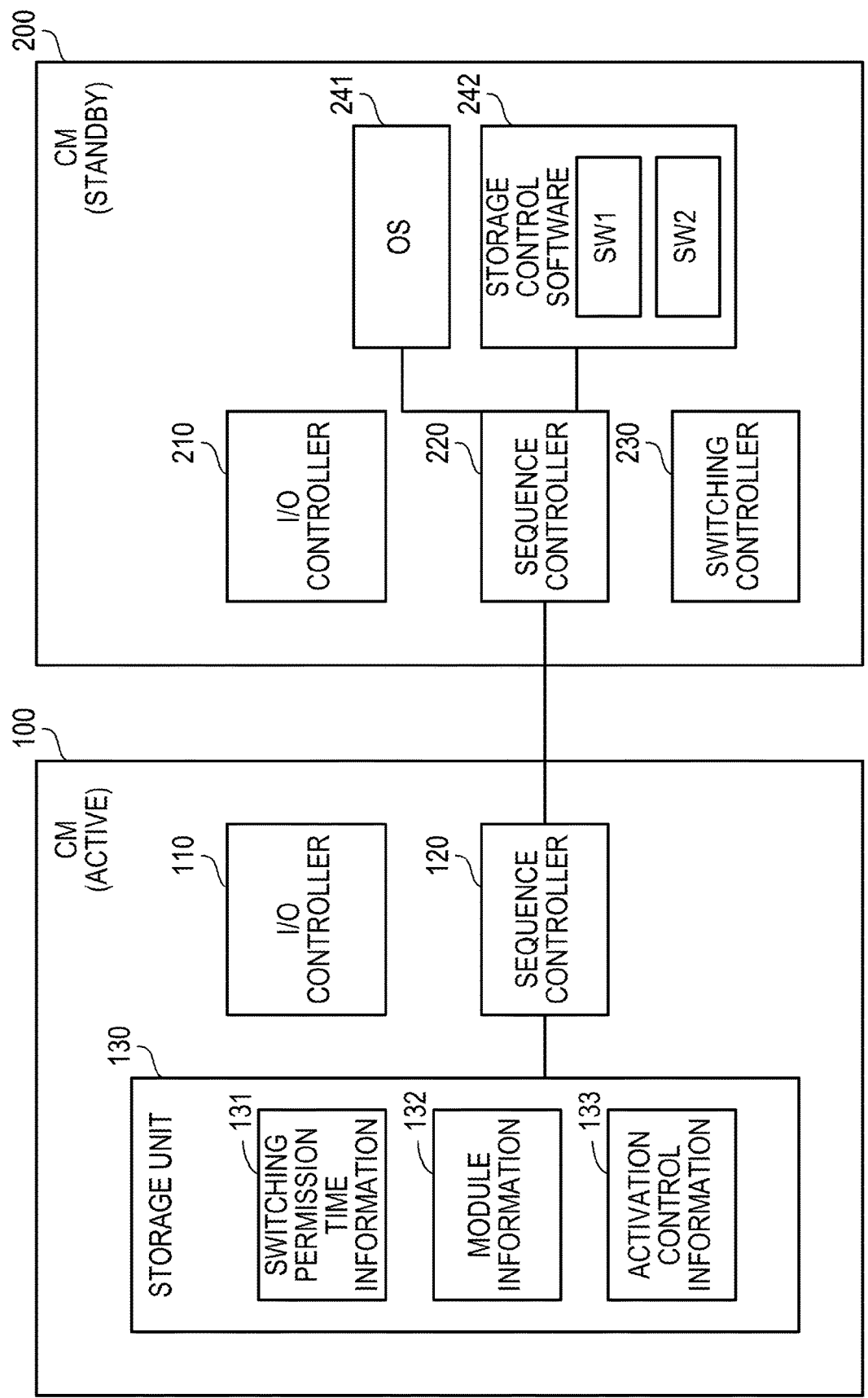
FIG. 3 is a block diagram illustrating an example of a configuration of a processing function of a CM.

FIG. 3 is a block diagram illustrating an example of a configuration of a processing function of a CM. Further, in the following description, it is assumed that CM 100 is active and CM 200 is in the standby state as an example.

The active CM 100 has an I/O controller 110, a sequence controller 120, and a storage unit 130. Processing of the I/O controller 110 and the sequence controller 120 is implemented, for example, by executing a predetermined program by the processor 101 of the CM 100. The storage unit 130 is implemented, for example, as the storage area of the RAM 102 of the CM 100.

The I/O controller 110 controls the I/O processing for the storage device mounted on the DE 300 according to the I/O request from the business server 20. For example, the I/O controller 110 controls the I/O processing for the logical volume using the storage device in the DE 300 according to the I/O request from the business server 20. Further, for example, when storing data requested to be written in the logical volume in the storage device in the DE 300, the I/O controller 110 executes data compression processing or deduplication processing of preventing data having the same contents from being duplicated.

The sequence controller 120 is a processing block that executes processing in cooperation with the standby CM 200 via the internal interface 104. While the CM 100 is active, the sequence controller 120 controls which module among the modules of the standby CM 200 is to be activated. At this time, the module as an activation control target is a module that operates when the CM 200 transitions to the active state. Further, in the following description, among the modules as the activation control target, the module to be activated is referred to as an "activation module" and the module to be stopped is referred to as a "stop module."

In the embodiment, it is assumed that the module as the activation control target is a program to be executed by the CM 200. Therefore, the module as the activation control target is a program executed by the processor 201 when the CM 200 transitions to the activation state. Further, hardware may be included in the module as the activation control target. For example, the host interface 205 or the drive interface 206 may be applied as the module as the activation control target.

In the above execution control, the sequence controller 120 determines the activation module and the stop module based on the switching time required for the processing (switching processing of the active CM) of switching the active CM from the CM 100 to the CM 200. Specifically, the sequence controller 120 determines the activation module and the stop module so that activation of all stop modules is completed during a period from the start to the completion of the switching processing of the active CM. Further, the sequence controller 120 dynamically changes the activation module and the stop module according to the operation state of the CM 100.

Switching permission time information 131, module information 132, and activation control information 133 are stored in the storage unit 130. All of the switching permission time information 131, the module information 132, and the activation control information 133 are information referred to by the sequence controller 120.

The switching permission time information 131 includes a switching permission time for each state of the operation of the CM 100. The module information 132 includes the activation time and the power consumption for each of the modules as the activation control target. The activation time is a time required to activate the module. The power consumption is power consumed by execution of the module. The activation control information 133 mainly includes information indicating a module set as the activation module or the stop module.

Meanwhile, the standby CM 200 has an I/O controller 210, a sequence controller 220, and a switching controller 230. Processing of the I/O controller 210, the sequence controller 220, and the switching controller 230 is implemented, for example, by executing a predetermined program by the processor 201 of the CM 200. However, it is desirable that the processing of the sequence controller 220 and the switching controller 230 is implemented by a program executed by the processor 201 even in a situation where an OS is not activated, such as a basic input/output system (BIOS). The processing of the sequence controller 220 and the switching controller 230 may be executed by a dedicated circuit apart from the processor 201.

The I/O controller 210 executes the same processing as the I/O controller 110. That is, when the CM 200 transitions to the activation state, the I/O controller 210 takes over the processing that the I/O controller 110 executes.

The sequence controller 220 controls the activation of the module in the CM 200 in accordance with the instruction from the sequence controller 120 of the active CM 100. In such a control, the sequence controller 220 controls only the module instructed from the sequence controller 120 of the active CM 200 among the modules of the CM 200 to be activated. Further, in response to the instruction from the sequence controller 120, the sequence controller 220 measures the time required to activate each module and the power consumption accompanied by the execution of each module and notifies the sequence controller 120 of the time and the power consumption. In addition, the sequence controller 220 communicates with the CM 100 through the internal interface 204.

Herein, in the embodiment, it is assumed that an OS 241 and storage control software 242 are stored in the CM 200 as the module as the activation control target by the sequence controller 220 are stored in the CM 200. The storage control software 242 is a program module for implementing the processing of the I/O controller 210 and is executed in an environment in which the OS 241 is activated. In the embodiment, as an example, the storage control software 242 is divided into two program modules, that is, software SW1 and SW2. That is, the processor 201 of the CM 200 may execute a part of the processing of the I/O controller 210 by executing the software SW1 and execute the remaining processing of the I/O controller 210 by executing the software SW2.

Further, the data corresponding to the OS 241, the software SW1, and the software SW2, respectively are stored, for example, in the SSD 203 of the CM 200.

The switching controller 230 controls the processing of switching the CM 200 from the standby state to the activation state.

According to the above configuration, the sequence controller 120 determines the activation module and the stop module so that activation of all stop modules is completed during a period from the start to the completion of the switching processing in which the CM 200 changes from the standby state to the activation state. In addition, according to the determination result, the sequence controller 220 activates only the activation module and stops execution of the stop module.

As a result, in the standby CM 200, only necessary minimum modules are activated within a range that does not affect the switching time of the active CM among modules that need to be activated when the CM 200 transitions to the activation state. Therefore, it is possible to reduce the power consumption in the standby CM 200 without extending the switching time of the active CM from the permission time.

Herein, in recent storage control devices, the enhancement in functionality has progressed and many types of processing are thus executed. For this reason, high performance is required for the storage control device and there is a problem that the power consumption increases accordingly.

For example, as described above, the I/O controller 110 executes, for example, the I/O control processing for the logical volume corresponding to the I/O request from the business server 20, the compression processing of the data stored in the storage device in the DE 300, and deduplication processing at the time of the storage. In particular, when the SSD is used as the storage device in the DE 300, there is a demand to reduce the number of times of writing to the SSD in order to prolong the lifetime of the SSD, so that the necessity of the data compression processing or the deduplication processing increases.

As described above, there is a problem in that the power consumption of the CM 100 increases due to the enhancement in functionality of the CM 100. Further, although the power consumption of the DE 300 may be reduced by changing the storage device in the DE 300 from the HDD to the SSD, on the other hand, the power consumption of the CM 100 tends to increase due to the above reason. From the point of view, it may be said that measures to reduce the power consumption of the storage control device among power saving measures of the storage system are important.

Furthermore, when the storage control device is made redundant as in the embodiment, there are the following problems. For example, when the same module as the active CM 100 is activated in the standby CM 200, almost the same-degree of power as the CM 100 is consumed in the CM 200. Meanwhile, when the activation of some of the modules is stopped in the standby CM 200, it is necessary to activate the modules at the time of the switching processing of the active CM, and extra time may be required for the switching processing as much.

In response to such a problem, according to the storage device 10 of the present embodiment, as described above, the power consumption in the standby CM 200 may be reduced without extending the switching processing time beyond the permission time.

Next, a specific example of information stored in the storage unit 130 will be described with reference to FIGS. 4 to 6.

Figure 4:
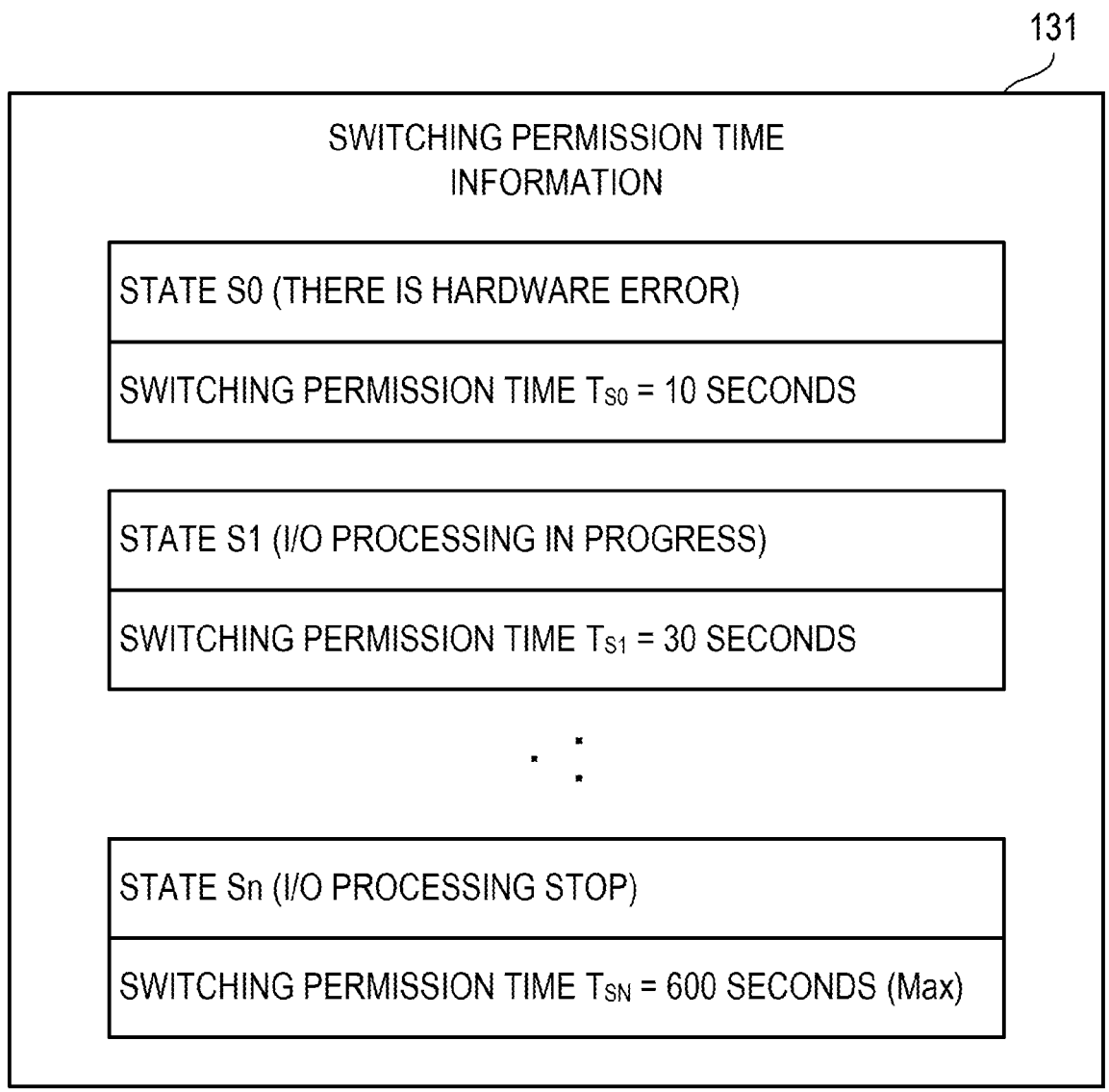
FIG. 4 is a diagram illustrating a specific example of switching permission time information.

First, FIG. 4 is a diagram illustrating a specific example of switching permission time information. In the switching permission time information 131, the switching permission time is preset for each state of the operation in the active CM 100. The switching permission time indicates the upper limit value of the time which may be allowed from the start to the completion of the switching processing of the active CM in the case where an event to switch the active CM occurs in the CM 100 in that state. Therefore, in the processing of determining the activation module and the stop module by the sequence controller 120, activation of all stop modules is required to be completed within the switching permission time.

In the example of FIG. 4, a pair of the state and the switching permission time is set in the switching permission time information 131 in ascending order of corresponding switching permission time. For example, a shortest switching permission time $T_{S0}$=10 seconds is set for state S0 and a second shortest switching permission time $T_{S1}$=30 seconds is set for state S1. Further, assuming that there are n states (where n is an integer of 2 or more) as the state of the operation of the CM 100, a longest switching permission time $T_{Sn}$=600 seconds is set in state Sn.

Herein, for example, state Sn is a state in which the CM 100 stops accepting the I/O request from the business server 20 and stops the execution of the I/O processing. Such a state includes, for example, a state immediately after the activation of the CM 100, or a state in which a current time is outside business hours using the business server 20.

Herein, for example, state S1 is a state (a state in which the I/O processing is in progress) in which the CM 100 permits accepting the I/O request from the business server 20. In the state in which the I/O processing is in progress, when the operation of the active CM 100 stops, the I/O request from the business server 20 may not be processed, which hinders business processing in the business server 20. For this reason, in state S1, the switching permission time becomes shorter than state Sn in which the I/O processing stops.

As a specific example, the switching permission time corresponding to the states S1 and Sn is set based on an abnormality determination time until a CM as a transmission destination is determined to be abnormal after the business server 20 transmits the I/O request. That is, a time shorter than the abnormality determination time is set as the switching permission time $T_{S1}$ corresponding to state S1 and a time equal to or longer than the abnormality determination time is set as the switching permission time $T_{Sn}$ corresponding to state Sn. As such an abnormality determination time, a timeout time of the I/O request in the business server 20 may be applied. Alternatively, it is also possible to apply a time until it is determined that a response may not be obtained even after transmission of the I/O request is reattempted a predetermined number of times since transmitting the I/O request.

As such, the switching permission time corresponding to the states S1 and Sn is set based on the abnormality determination time in the business server 20. From this, it may be said that the switching permission time corresponding to the states S1 and Sn is the upper limit time at which the I/O processing may be stopped by stopping the acceptance of the I/O request.

Further, in the example of FIG. 4, state S0 is also in the state of the I/O processing as in state S1. However, state S1 is a state in which no error occurs in the hardware of the CM 100 and state S0 is a state in which the hardware error occurs. In state S0, there is a possibility that the business server 20 determines that the CM as the transmission destination is abnormal in a shorter time than the above-described abnormality determination time due to an influence of the hardware error.

Therefore, as the switching permission time $T_{S0}$ corresponding to state S0, a time shorter than the switching permission time $T_{S1}$ corresponding to state S1 is set. As an example in FIG. 4, the switching permission time $T_{S0}$ is set to 10 seconds. Further, it may be said that the upper limit time at which the acceptance of the I/O request may be stopped and the I/O processing may be stopped by stopping in state S0 may be shorter than that in state S1.

In addition, for example, even in the state of the I/O processing, the former switching permission time is made shorter than the latter switching permission time in a state in which more than a predetermined number of I/O requests are received within the latest fixed time and in a state in which more than a predetermined number of I/O requests are not received. Further, the switching permission time may be changed according to the type of hardware error. For example, in the case of a collective error, a switching permission time which is longer than that in the case of a non-collective error may be set.

As in the above examples, the switching permission time may vary depending on the state of the operation in the active CM 100.

FIG. 5 is a diagram illustrating a specific example of module information. In the module information 132, the activation time and the power consumption are set for each module as the activation control target. The activation time is a time required to activate the module. The power consumption is power consumed by execution of the module. Further, as the activation time and the power consumption, values appropriately acquired from the CM 200 according to an inquiry from the sequence controller 120 are set.

In the example of FIG. 5, an activation time $T_{E1}$ of the software SW2 is set to 10 seconds and power consumption $P_{E1}$ of the software SW2 is set to 50 W (watts). Further, an activation time $T_{E2}$ of the software SW1 is set to 10 seconds and power consumption $P_{E2}$ of the software SW1 is set to 100 W. In addition, an activation time $T_{E3}$ of the OS 241 is set to 30 seconds and power consumption $P_{E3}$ of the OS 241 is set to 100 W.

Further, in the embodiment, it is assumed that an activation order of the modules in the CM 200 is determined. Specifically, in the CM 200, it is assumed that the OS 241, the software SW1, and the software SW2 are activated in this order. This indicates that when determining the activation module among the modules as the activation control target, the module is selected in a late activation order and whether to determine the selected module as the activation module is determined.

Further, in addition to the above, in the module information 132, a mode change time $T_{E0}$ and mode change power consumption $P_{E0}$ are preset. The mode change refers to processing that is fixedly performed in the CM 200, regardless of the state of the active CM 100 during the switching processing of the active CM. Such processing includes, for example, processing of changing an operation mode indicating whether the CM 200 is in the activation state or the standby state set in the CM 200, or processing (e.g., port validation processing of the host interface 205) of changing an access path from the business server 20.

The mode change time $T_{E0}$ is a time required for the mode change and the mode change power consumption $P_{E0}$ is power consumed by execution of the mode change. In the example of FIG. 5, the mode change time $T_{E0}$ is registered as 10 seconds and the mode change power consumption $P_{E0}$ is set as 999 W.

Figure 6:
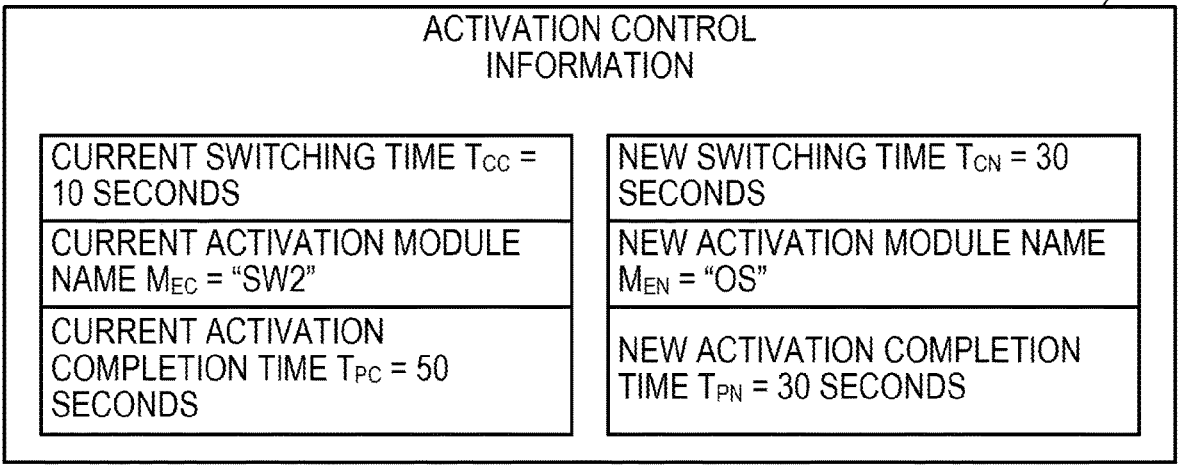
FIG. 6 is a diagram illustrating a specific example of activation control information.

FIG. 6 is a diagram illustrating a specific example of activation control information. In the activation control information 133, a current switching time $T_{CC}$, a current activation module name $M_{EC}$, a current activation completion time $T_{PC}$, a new switching time $T_{CN}$, a new activation module name $M_{EN}$, and a new activation completion time $T_{PN}$ are set by the sequence controller 120.

The current switching time $T_{CC}$ indicates a currently set switching permission time. The current activation module name $M_{EC}$ indicates a module whose activation order is the latest among the modules currently determined as the activation module. The current activation completion time $T_{PC}$ indicates a time required to activate all modules currently determined as the stop module.

The new switching time $T_{CN}$ indicates the switching permission time set next. The new activation module name $M_{EN}$ indicates a module with the last activation order among the modules determined as the activation module next. The new activation completion time $T_{PN}$ indicates a time required to activate all modules determined as the stop module next.

The new switching time $T_{CN}$, the new activation module name $M_{EN}$, and the new activation completion time $T_{PN}$ are information set when re-determining the activation module and the stop module. When the activation state of the module is updated according to the result of the re-determination, values set as the new switching time $T_{CN}$, the new activation module name $M_{EN}$, and the new activation completion time $T_{PN}$ are set with respect to the current switching time $T_{CC}$, the current activation module name $M_{EC}$, and the current activation completion time $T_{PC}$.

Next, with reference to the flowcharts in FIGS. 7 to 11, the processing in the active CM 110 will be described.

Figure 7:
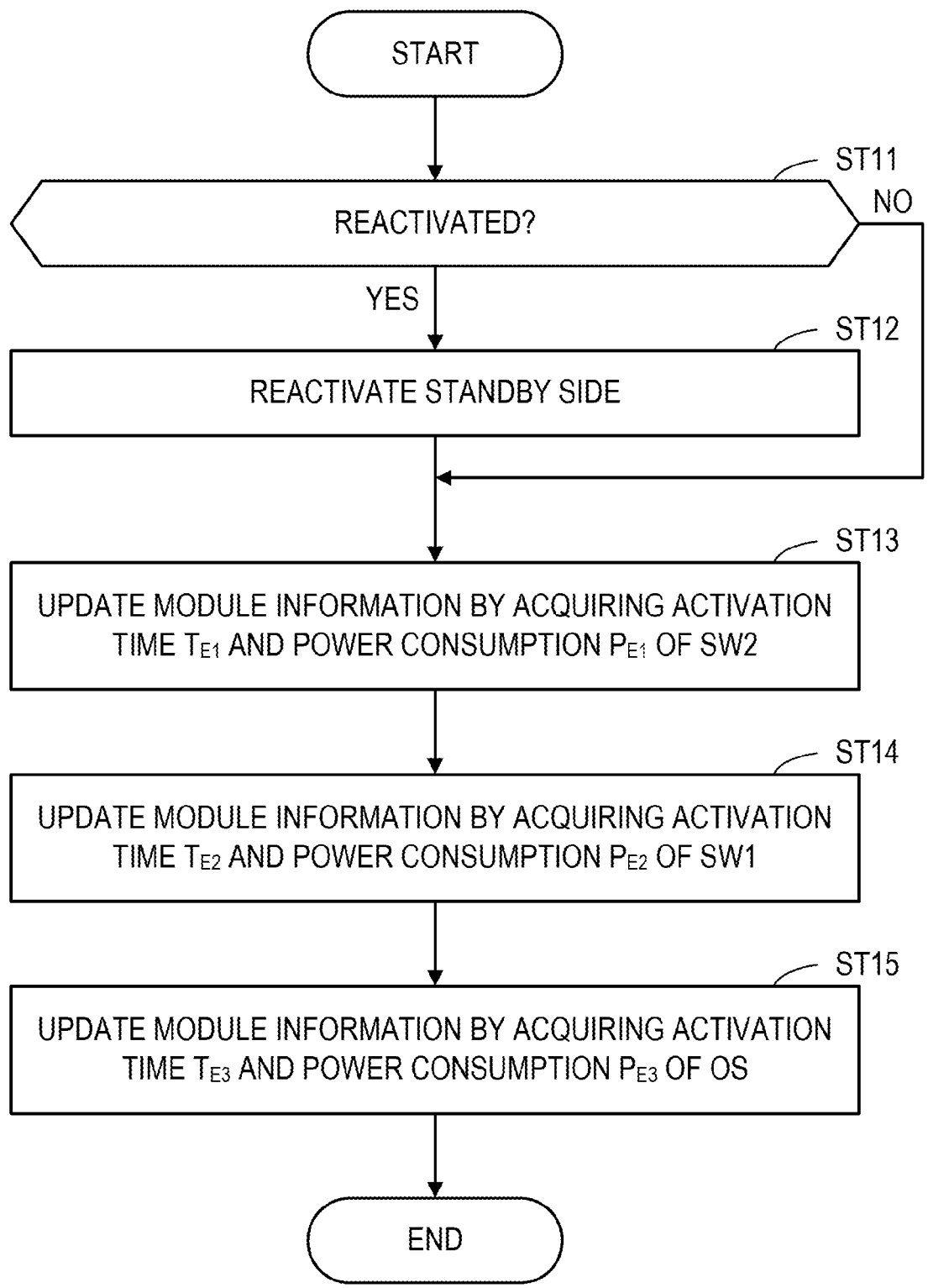
FIG. 7 is a flowchart illustrating an example of an acquisition processing of an activation time and power consumption of a module.

First, FIG. 7 is a flowchart illustrating an example of an acquisition processing of an activation time and power consumption of a module. The processing of FIG. 7 is repeatedly executed at, for example, predetermined time intervals.

(Step ST11) The sequence controller 120 determines whether to reactivate the CM 200. For example, the sequence controller 120 determines the CM 200 to be reactivated when the I/O processing is not in progress and a predetermined time or more has passed since the previous reactivation. When it is determined that the CM 200 is to be reactivated, the sequence controller 120 executes the processing of step ST12 and when it is determined that the CM 200 is not to be reactivated, the sequence controller 120 executes the processing of step ST13.

(Step ST12) The sequence controller 120 instructs the CM 200 in the standby state to be reactivated. When the reactivation of the CM 200 starts, the sequence controller 220 of the CM 200 sequentially activates the OS 241, and the software SW1 and SW2 and measures the activation time and the power consumption of each of the OS 241, the software SW1 and SW2.

(Step ST13) The sequence controller 120 acquires from the CM 200 the latest measurement result of the activation time $T_{E1}$ and the power consumption $P_{E1}$ of the software SW2 and updates the module information 132 according to the acquisition content.

(Step ST14) The sequence controller 120 acquires from the CM 200 the latest measurement result of the activation time $T_{E2}$ and the power consumption $P_{E2}$ of the software SW1 and updates the module information 132 according to the acquisition content.

(Step ST15) The sequence controller 120 acquires from the CM 200 the latest measurement result of the activation time $T_{E3}$ and the power consumption $P_{E3}$ of the OS 241 and updates the module information 132 according to the acquisition content.

Further, the processing order of steps ST13 to ST15 may be changed. In addition, in the CM 200, there is a case that the power consumption for each module may be measured without reactivation. In steps ST13 to ST15, the sequence controller 120 may acquire the power consumption measured as such.

Figure 8:
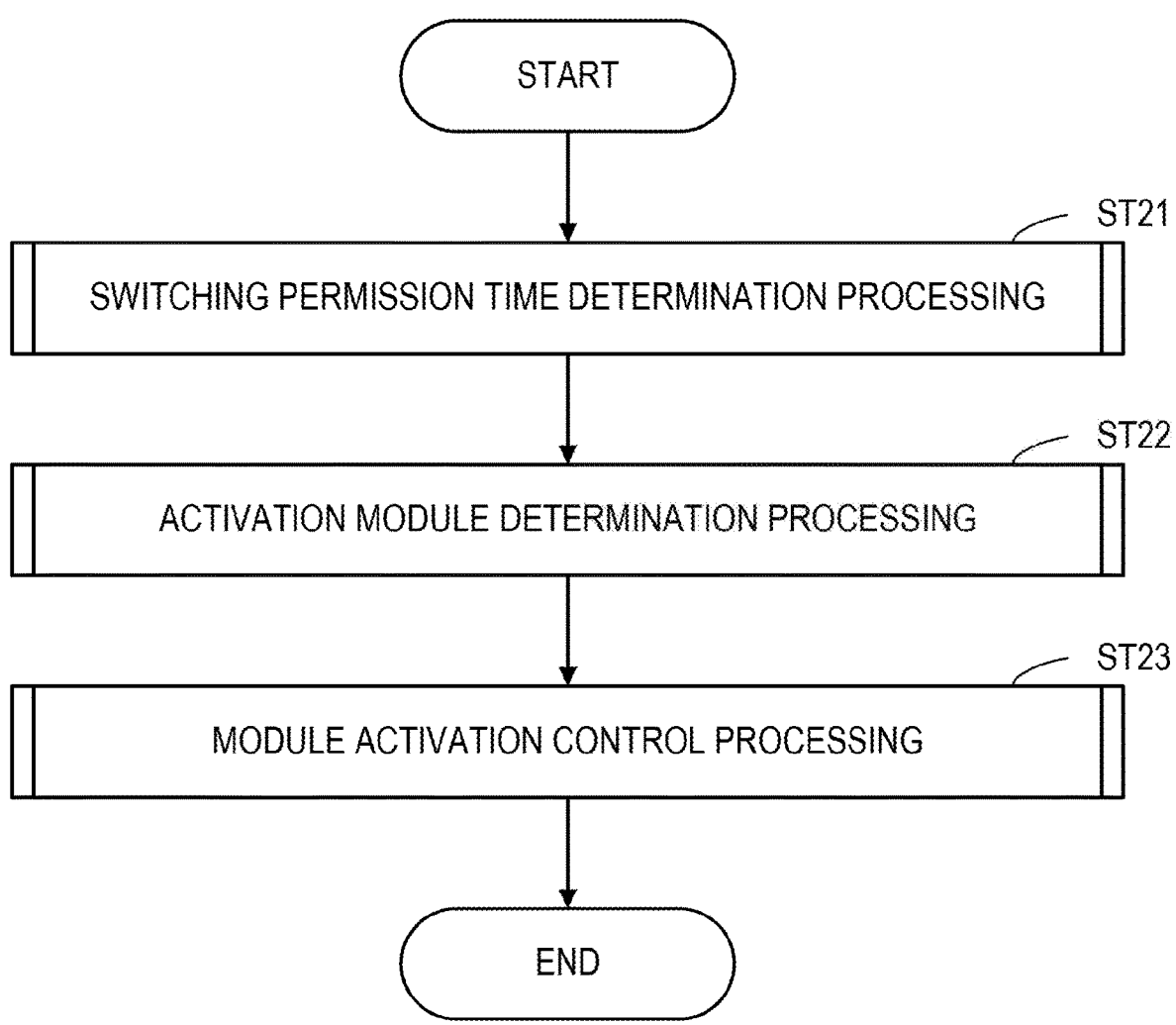
FIG. 8 is a flowchart illustrating an example of an update processing of an activation state of the module.

Next, FIG. 8 is a flowchart illustrating an example of an update processing of an activation state of the module. The processing of FIG. 8 is repeatedly executed at, for example, predetermined time intervals. Further, it is desirable that a time interval at which the processing of FIG. 8 is executed is shorter than a minimum value of the switching permission time registered in the switching permission time information 131.

(Step ST21) The sequence controller 120 determines the switching permission time depending on the current state of the CM 100. Further, details of the processing will be described with reference to FIG. 9.

(Step ST22) The sequence controller 120 determines the activation module based on the determination result in step ST21 and the module information 132. Further, the details of the processing will be described with reference to FIG. 10.

(Step ST23) The sequence controller 120 activates the activation module among the modules as the activation control target and executes control processing of stopping the stop module. Further, the details of the processing will be described with reference to FIG. 11.

Figure 9:
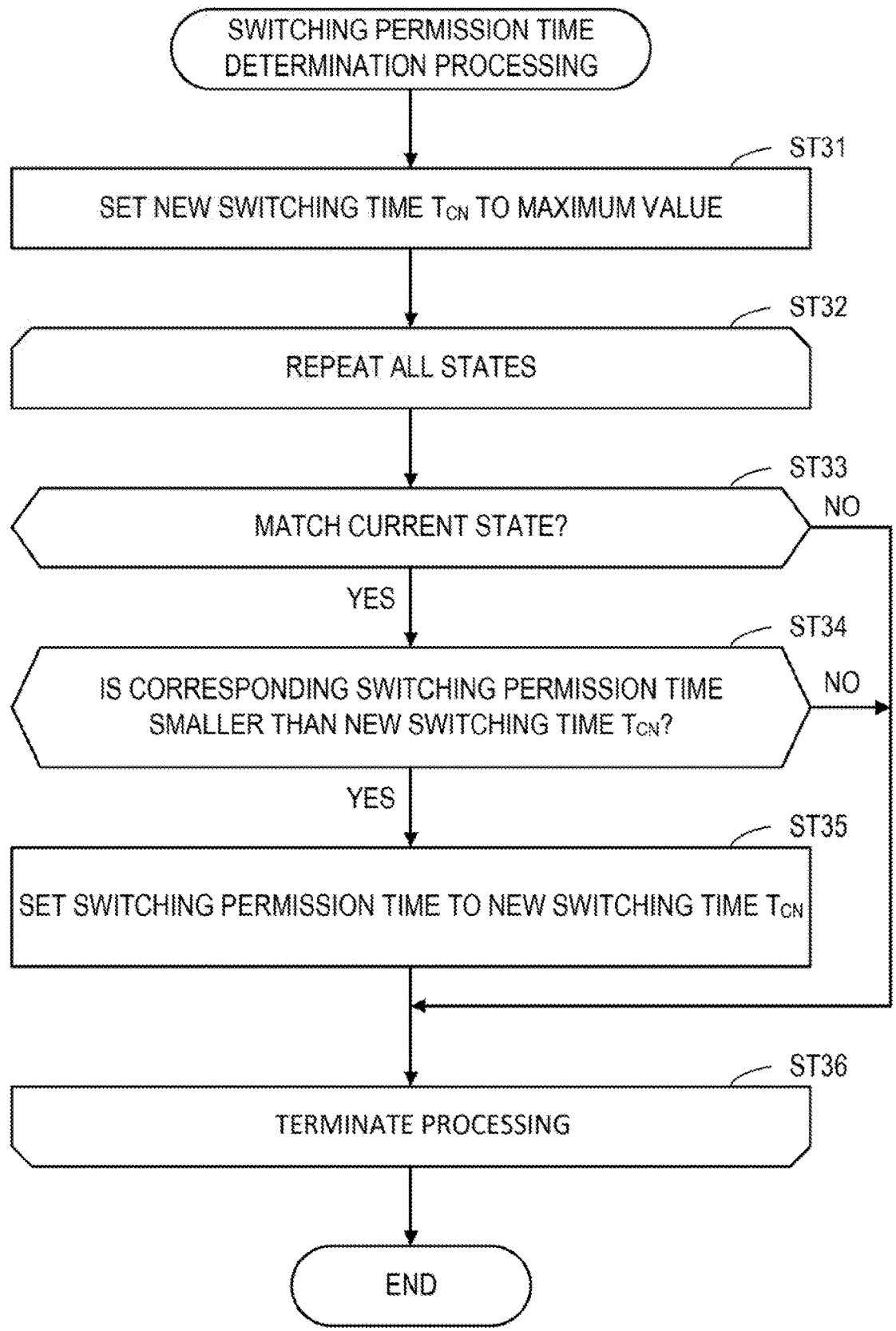
FIG. 9 is a flowchart illustrating an example of a switching permission time determination processing.

FIG. 9 is a flowchart illustrating an example of a switching permission time determination processing. Further, the processing of FIG. 9 corresponds to the processing of step ST21 of FIG. 8.

(Step ST31) The sequence controller 120 sets a maximum value as the initial value in the new switching time $T_{CN}$ in the activation control information 133. The maximum value is a maximum value of the switching permission time set in the switching permission time information 131 and in the example illustrated in FIG. 4, the switching permission time $T_{Sn}$ corresponding to state Sn is 600 seconds.

(Step ST32) The sequence controller 120 repeatedly executes the processing up to a loop end in step ST36 for all the states set in the switching permission time information 131.

(Step ST33) The sequence controller 120 determines whether the current state of the CM 100 matches the state of a processing target selected from the switching permission time information 131. When it is determined that the states match, the sequence controller 120 executes the processing of step ST34, and when it is determined that the states do not match, the sequence controller 120 makes the processing proceed to step ST36.

(Step ST34) The sequence controller 120 determines whether the switching permission time associated with the state of the processing target in the switching permission time information 131 is shorter than the currently set new switching time $T_{CN}$. When it is determined that the switching permission time is shorter than the new switching time $T_{CN}$, the sequence controller 120 executes the processing of step ST35 and when it is determined that the switching permission time is equal to or longer than the new switching time $T_{CN}$, the sequence controller 120 makes the processing proceed to step ST36.

(Step ST35) The sequence controller 120 sets the switching permission time associated with the state of the processing target with respect to the new switching time $T_{CN}$ and updates the new switching time $T_{CN}$.

(Step ST36) The sequence controller 120 terminates the processing when the processing of steps ST33 to S35 is executed for all of the states set in the switching permission time information 131.

According to the above processing of FIG. 9, the switching permission time corresponding to the current state of the CM 100 is set with respect to the new switching time $T_{CN}$.

Figure 10:
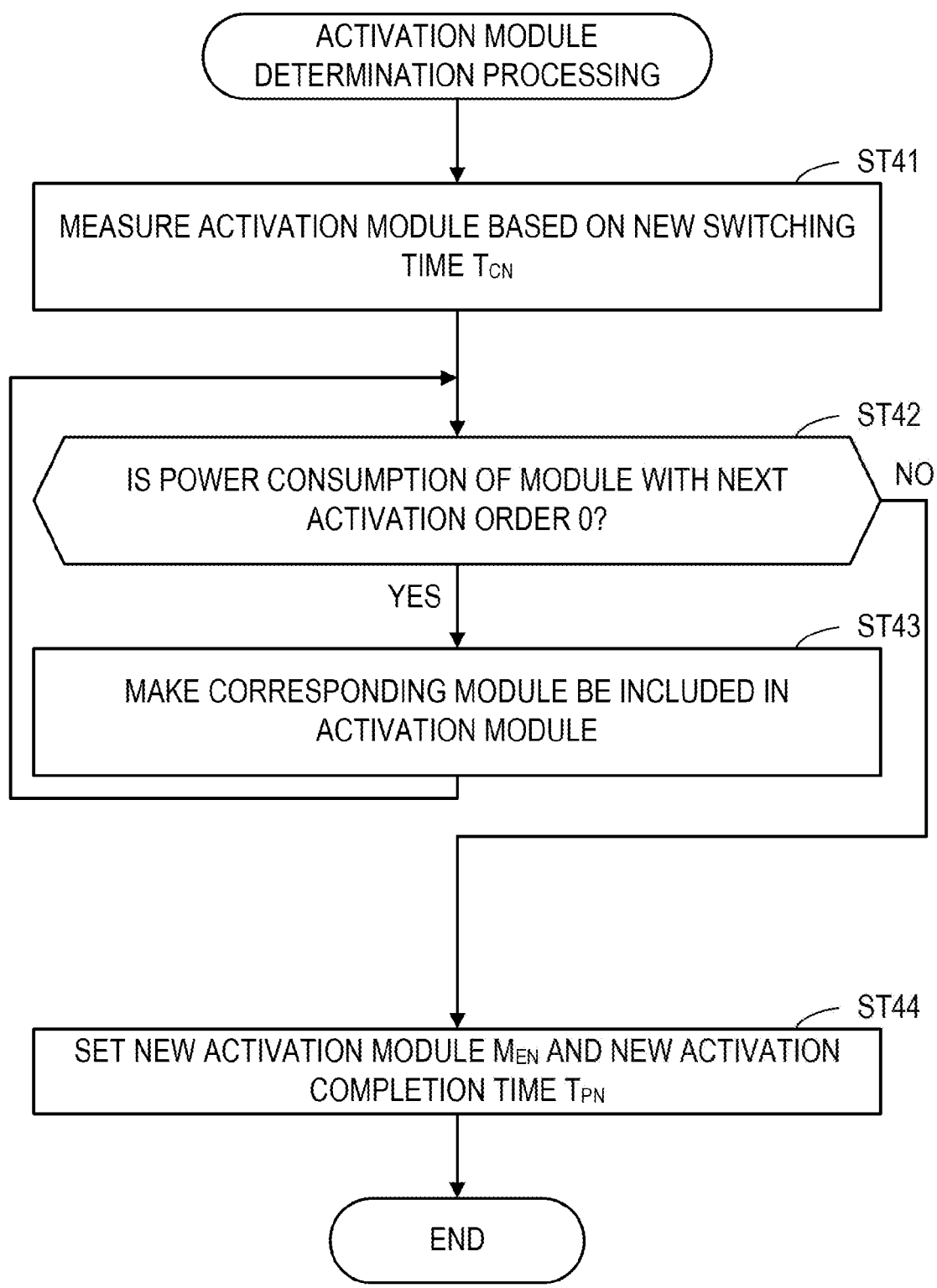
FIG. 10 is a flowchart illustrating an example of an activation module determination processing.

FIG. 10 is a flowchart illustrating an example of an activation module determination processing. Further, the processing of FIG. 10 corresponds to the processing of step ST22 of FIG. 8.

(Step ST41) The sequence controller 120 specifies the activation module to be activated in the standby CM 200 based on the new switching time $T_{CN}$ set by the processing in FIG. 9 by referring to the module information 132. Specifically, the activation module is specified as follows.

The sequence controller 120 cumulatively adds up the activation time corresponding to the modules in a late activation order of the modules by referring to the module information 132. In the embodiment, the corresponding activation time is cumulatively added in the order of the software SW2, the software SW1, and the OS 241. The sequence controller 120 selects the module such that the cumulative addition value and the addition value of the mode change time $T_{E0}$ become the maximum within the range of the new switching time $T_{CN}$ or less. A module other than the selected module becomes the activation module.

In the case of using examples of numerical values illustrated in FIGS. 4 and 5, for example, the activation module is specified as follows. For example, when the CM 100 is in state S1, the corresponding switching permission time $T_{S1}$ is 30 seconds. The mode change time $T_{E0}$ is 10 seconds, the activation time $T_{E1}$ of the software SW2 is 10 seconds, the activation time $T_{E2}$ of the software SW1 is 10 seconds, and the activation time $T_{E3}$ of the OS 241 is 30 seconds.

When the mode change time $T_{E0}$ is added to the cumulative addition value of the activation time $T_{E1}$ of the software SW2 and the activation time $T_{E2}$ of the software SW1, the total becomes 30 seconds, which becomes 30 seconds or less, which is the switching permission time $T_{S1}$. Meanwhile, when the mode change time $T_{E0}$ is added to the cumulative addition value of the activation time $T_{E1}$ of the software SW2, the activation time $T_{E2}$ of the software SW1, and the activation time $T_{E3}$ of the OS 241, the total becomes 60 seconds, which exceeds 30 seconds which is the switching permission time $T_{S1}$. Therefore, since the software SW1 and SW2 is selected based on the above-described module selection condition, the OS 241 excluding the software SW1 and SW2 is specified as the activation module.

(Step ST42) The sequence controller 120 specifies the module having the last activation order among the modules specified as the activation module. For example, when the OS 241 and the software SW1 are specified as the activation module, the software SW1 is specified as the module having the last activation order. The sequence controller 120 determines whether the power consumption of a module (next module) whose activation order is the next to the specified module is "0" by referring to the module information 132. When it is determined that the power consumption of the next module is "0," the sequence controller 120 executes the processing of step ST43 and when it is determined that the power consumption of the next module is not "0," the sequence controller 120 executes the processing of step ST44. In the latter case, the activation module and the stop module are in a definite state.

(Step ST43) The sequence controller 120 makes the next module specified in step ST42 be included in the activation module. Thereafter, the processing of step ST42 is executed again.

Here, when the power consumption of the specified next module is "0," the power consumption of the CM 200 is not changed even though the next module is activated. That is, even though the next module is stopped, a power saving effect may not be obtained. Therefore, in step ST43, the next module is included in the activation module, and the next module is also thus activated. Therefore, the time for activating the stop module in the CM 200 during the switching processing is shortened, so that it is possible to reliably complete the switching processing within the switching permission time and to shorten the switching processing time itself.

(Step ST44) The sequence controller 120 sets a module name of the module having the last activation order among the determined activation modules as the new activation module name $M_{EN}$ of the activation control information 133. In addition, the sequence controller 120 adds the activation time of each module (stop module) other than the activation module and sets the calculated addition value to the new activation completion time $T_{PN}$ of the activation control information 133.

Figure 11:
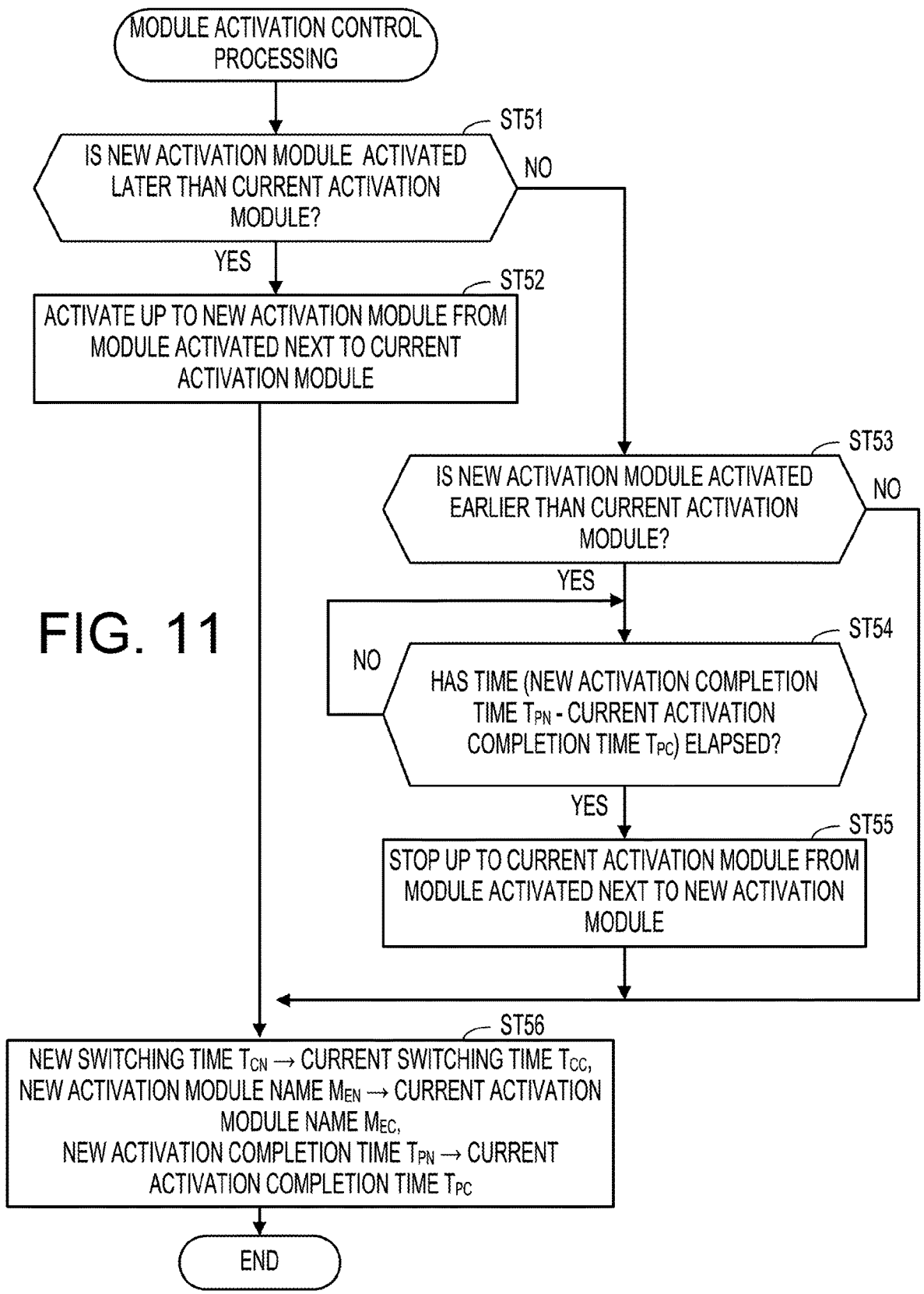
FIG. 11 is a flowchart illustrating an example of a module activation control processing.

FIG. 11 is a flowchart illustrating a module activation control processing example. Further, the processing of FIG. 11 corresponds to the processing of step ST23 of FIG. 8.

(Step ST51) The sequence controller 120 determines whether the module (new activation module) indicated by the new activation module name $M_{EN}$ is activated later than the module (current activation module) indicated by the current activation module name $M_{EC}$ by referring to the activation control information 133. When it is determined that the condition is satisfied, the sequence controller 120 executes the processing of step ST52 and when it is determined that the condition is not satisfied, the sequence controller 120 executes the processing of step ST53.

(Step ST52) A case of "Yes" determined in step ST52 is a case in which a module newly specified as the activation module exists in the stop modules which currently stop. The sequence controller 120 instructs the CM 200 to activate each module from the module (stop module) to be activated next to the current activation module to the new activation module according to the activation order. In response to such an instruction, the sequence controller 220 of the CM 200 activates only the module newly specified as the activation module among the currently stopped stop modules.

(Step ST53) The sequence controller 120 determines whether the new activation module is a module to be activated earlier than the current activation module. When it is determined that the condition is satisfied, the sequence controller executes the processing of step ST54 and when it is determined that the condition is not satisfied, the sequence controller executes the processing of step ST56. Further, the latter case is a case where the new activation module and the current activation module are the same module and it is not necessary to newly the module to be activated or stopped at the present time.

(Step ST54) The sequence controller 120 calculates a time obtained by subtracting the current activation completion time $T_{PC}$ from the new activation completion time $T_{PN}$ by referring to the activation control information 133. The sequence controller 120 becomes in the standby state until the calculated time elapses and executes the processing of step ST55 when the calculated time elapses.

(Step ST55) A case in which the result is determined as "Yes" in step ST53 is a case in which a module newly specified as the stop module exists in the activation modules which are currently activated. The sequence controller 120 instructs the CM 200 to stop each module from the module (activation module) to be activated next to the new activation module to the current activation module according to a reverse order to the activation order. In response to such an instruction, the sequence controller 220 of the CM 200 stops only the module newly specified as the stop module among the current activated activation modules.

Herein, in the processing of FIG. 11, the instruction to stop the module in step ST55 is delayed by the time calculated in step ST54 and executed. In step ST54, a total activation time of the module specified as the new stop module among the currently activated activation modules may be obtained.

For example, the state of the CM 100 may be changed in a short time after the current state of the CM 100 is determined by the processing of FIG. 9. In addition, there may be a case where the changed state is a state in which the module specified as the new stop module among the currently activated activation modules is to be activated.

When an event to switch the active CM occurs immediately after such a state change, when the module specified as the new stop module is stopped, the activation of the stop module may not be completed within the permission time of the switching processing. That is, in such a case, it is more appropriate to keep the module specified as the new stop module activated.

By delaying the processing of step ST55 by the time calculated in step ST54 and executing the processing, it is possible to enhance the possibility of completing the activation of the stop module within the permission time of the switching processing time even when the case described above occurs. This also shows that the possibility of completing the activation of the stop module within the permission time of the switching processing time may be increased when the processing of step ST55 is executed. Further, by calculating a delay time by the method of step ST54, such possibility may be enhanced.

Further, it is also possible to suppress the probability of occurrence of frequent switching between stopping and activating of the module, such as a case where the module stopped by the processing of step ST55 is activated next when the processing of FIG. 8 is executed.

(Step ST56) The sequence controller 120 updates the activation control information 133 as follows. The sequence controller 120 sets the new switching time $T_{CN}$ to the current switching time $T_{CC}$ and updates the current switching time $T_{CC}$. Further, the sequence controller 120 sets the new activation module name $M_{EN}$ to the current activation module name $M_{EC}$ and updates the current activation module name $M_{EC}$. Further, the sequence controller 120 sets the new activation completion time $T_{PN}$ to the current activation completion time $T_{PC}$ and updates the current activation completion time $T_{PC}$.

Figure 12:
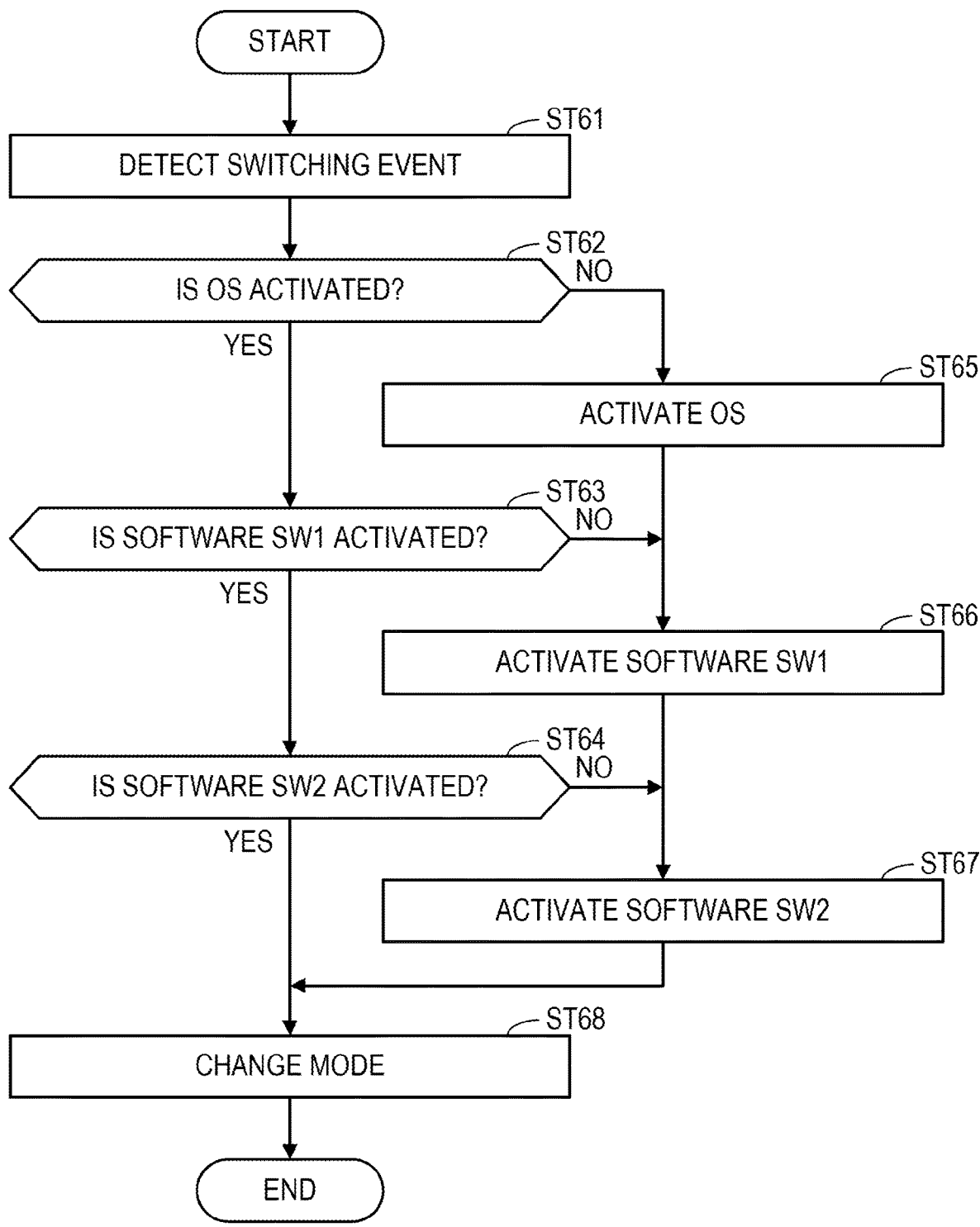
FIG. 12 is a flowchart illustrating an example of a switching processing of an active CM.

FIG. 12 is a flowchart illustrating an example of a switching processing of an active CM. Herein, a case where the CM 200 transits from the standby state to the activation state will be described.

(Step ST61) The switching controller 230 of the CM 200 detects a switching event indicating that the switching of the active CM needs to be performed. For example, the switching controller 230 receives an instruction to switch the active CM from the CM 100. Such a switching instruction may be received from an external monitoring server instead of the CM 100. Alternatively, the switching controller 230 detects that the operation of the CM 100 stops. Upon detecting such a switching event, the switching controller 230 executes the onward processing after step ST62.

(Step ST62) The switching controller 230 determines whether the OS 241 is activated. When it is determined that the OS 241 is activated, the switching controller 230 executes the processing of step ST63 and when it is determined that the OS 241 is not activated, the switching controller 230 executes the processing of step ST65.

(Step ST63) The switching controller 230 determines whether the software SW1 is activated. When it is determined that the software SW1 is activated, the switching controller 230 executes the processing of step ST64 and when it is determined that the software SW1 is not activated, the switching controller 230 executes the processing of step ST66.

(Step ST64) The switching controller 230 determines whether the software SW2 is activated. When it is determined that the software SW2 is activated, the switching controller 230 executes the processing of step ST68 and when it is determined that the software SW2 is not activated, the switching controller 230 executes the processing of step ST67.

(Step ST65) The switching controller 230 activates the OS 241.

(Step ST66) The switching controller 230 activates the software SW1.

(Step ST67) The switching controller 230 activates the software SW2.

(Step ST68) The switching controller 230 executes mode change processing of changing the operation mode of the CM 200 from the standby state to the activation state. Such mode change processing includes, for example, processing of changing a set value of the operation mode set in the CM 200, processing (e.g., or port validation processing of the host interface 205) of changing the access path from the business server 20.

According to the above processing of FIG. 12, it can be seen that the more the modules are activated at the time of detecting the switching event, the shorter the time required for the switching processing.

According to the second embodiment described above, the stop module to be stopped in the standby CM 200 is determined so as to activate the stop module within the permission time of the switching processing according to the state of the active CM 100. Therefore, it is possible to reduce the power consumption in the standby CM 200 within a range to keep the permission time of the switching processing. By keeping the permission time of the switching processing, it is possible to suppress a probability of occurrence of a situation where the business server 20 determines that a CM as a communication destination is abnormal and stops the business processing. Therefore, according to the second embodiment, it is possible to reduce the power consumption of the standby CM 200 without giving a bad influence as much as possible to the business processing of the business server 20.

Figure 13:
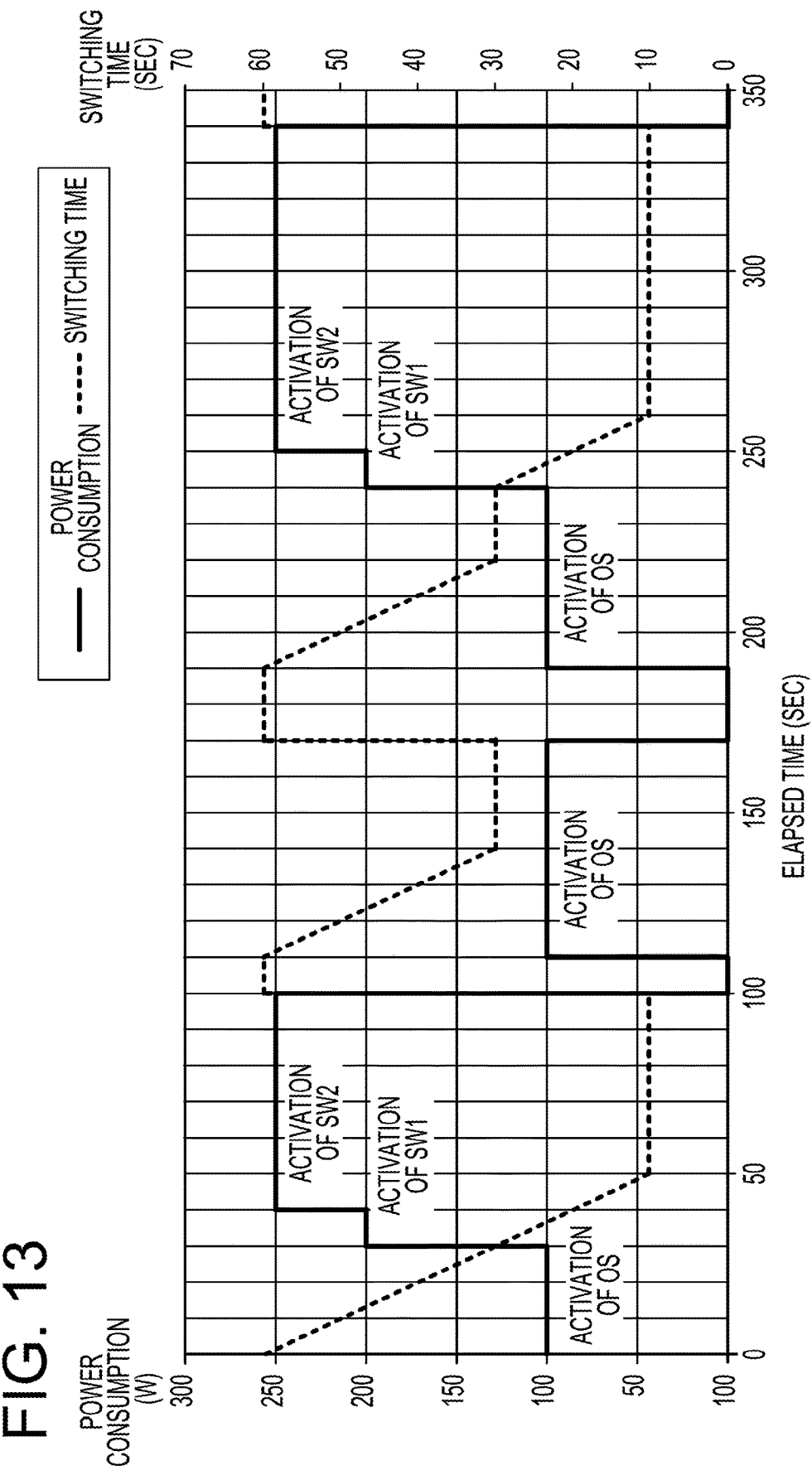
FIG. 13 is a diagram illustrating an example of a progress of power consumption and a switching time in a standby CM.

FIG. 13 is a diagram illustrating an example of a progress of power consumption and a switching time in a standby CM. A bold solid line illustrated in FIG. 13 indicates the progress of the power consumption due to activation of the module in the standby CM 200. A broken line illustrates in FIG. 13 indicates the progress of the switching time in the case where the CM 200 transitions to the activation state. The switching time includes a time required to activate the stop module at that time.

According to FIG. 13, it can be seen that as the number of modules activated in the standby CM 200 increases, the system is ready to complete the switching processing in a short time, but the power consumption of the CM 200 increases. According to the embodiment, the stop module is determined so as to activate the stop module within the permission time of the switching processing according to the state of the active CM 100. Therefore, it is possible to reduce the power consumption of the CM 200 without hindering the business processing in the business server 20 as much as possible.

Modification of Second Embodiment

A part of the processing of the CM 100 according to the second embodiment may be changed as follows.

First, a threshold value $P_{TH}$ of the power consumption is also set in the storage unit 130 of the CM 100. The threshold value $P_{TH}$ is a threshold value for determining whether the power consumption of the module may be regarded as "0." As the threshold value $P_{TH}$, a fixed value is preset. Further, the threshold value $P_{TH}$ may be arbitrarily set by an operation of a user. Using the threshold value $P_{TH}$, the activation module determination processing of FIG. 10 may be modified as illustrated in FIG. 14 below.

Figure 14:
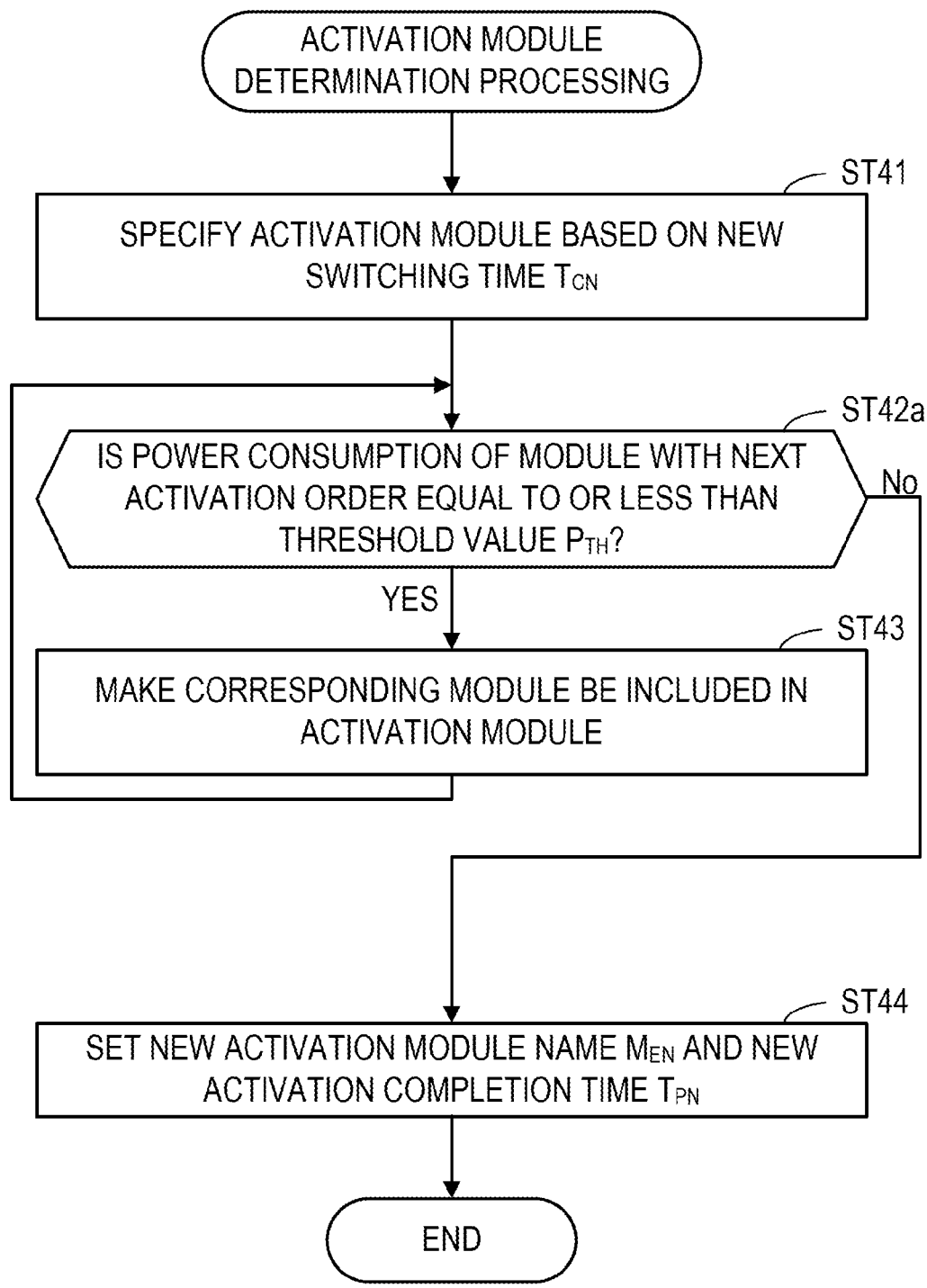
FIG. 14 is a flowchart illustrating an example of an activation module determination processing in a modification.

FIG. 14 is a flowchart illustrating an example of an activation module determination processing in a modification. In the processing of FIG. 14, step ST42a is executed instead of step ST42 of FIG. 10.

(Step ST42a) The sequence controller 120 specifies the module having the last activation order among the modules specified as the activation module in step ST41. The sequence controller 120 determines whether the power consumption of a module (next module) whose activation order is next to the specified module is equal to or less than the threshold value $P_{TH}$ by referring to the module information 132. When it is determined that the power consumption of the next module is equal to or less than the threshold value $P_{TH}$, the sequence controller 120 executes the processing of step ST43 and when it is determined that the power consumption of the next module is more than the threshold value $P_{TH}$, the sequence controller 120 executes the processing of step ST44.

In step ST42a, when the power consumption of the next module is equal to or less than the threshold value $P_{TH}$, it is determined that the power consumption may be regarded as "0." In this case, even though the next module is activated, an effect of reducing the power consumption is not very high as compared with the case where the next module is stopped. Meanwhile, by activating the next module, it is possible to enhance a certainty that the activation of the stop module may be completed within the switching permission time when the switching processing of the active CM is executed. Therefore, when it is determined in step ST42a that the power consumption of the next module is equal to or less than the threshold value $P_{TH}$, the next module is also specified as one of the activation modules by the processing of step ST43.

Further, as another example of processing that achieves the same effect as the processing in FIG. 14, the processing in FIG. 10 instead of FIG. 14 may be applied and the processing in FIG. 7 may be modified as follows. The sequence controller 120 acquires the power consumption of the module in steps ST13 to ST15, the sequence controller 120 compares the acquired power consumption and the threshold value $P_{TH}$. When the acquired power consumption is more than the threshold value $P_{TH}$, the sequence controller 120 sets the acquired power consumption in the module information 132 as it is. Meanwhile, when the acquired power consumption is equal to or less than the threshold value $P_{TH}$, the sequence controller 120 sets "0" as a value of the power consumption corresponding to the module in the module information 132.

By such processing, in step ST42 of FIG. 10, not only when the measured value of the power consumption of the module is "0" but also when the measured value may be regarded as "0," the result is determined as "Yes." As a result, the same effect as that of the processing of FIG. 14 may be obtained.

Further, processing functions of the devices (e.g., the information processing apparatuses 1 and 2 and the CMs 100 and 200) described in each embodiment may be realized by a computer. In this case, the program describing a processing content of a function which each device needs to have is provided and is executed by the computer, and as a result, the processing function is realized on the computer. The program that describes the processing contents may be recorded in a computer-readable recording medium. Examples of the computer-readable recording medium include a magnetic memory device, an optical disk, a magneto-optical recording medium, and a semiconductor memory. Examples of the magnetic memory device include a hard disk device (HDD), a flexible disk (FD), and a magnetic tape. Examples of the optical disk include a digital versatile disc (DVD), a DVD-RAM, a compact disc read only memory (CD-ROM), and a CD-recordable (R)/rewritable (RW). Examples of the magneto-optical recording medium include a magneto optical disk (MO).

When distributing a program, for example, a portable recording medium such as the DVD or the CD-ROM in which the program is recorded is sold. Further, the program may be stored in a memory device of a server computer and the program may be transferred from the server computer to another computer via a network.

The computer that executes the program, for example, stores the program recorded in the portable recording medium or the program transferred from the server computer in the memory device thereof. In addition, the computer reads the program from the memory device thereof and executes the processing according to the program. Further, the computer may read the program directly from the portable recording medium and execute the processing according to the program. In addition, each time the program is transferred from a server computer connected via the network, the computer may sequentially execute the processing according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
a memory configured to store first information and second information, the first information including a permission time with respect to each of a plurality of operation states of the information processing apparatus in an activation state, the permission time being a time allowed for switching a substitute apparatus from a standby state to the activation state, the substitute apparatus taking over processing of the information processing apparatus upon transitioning to the activation state, the second information being provided in the substitute apparatus and including an activation time required for activating each of a plurality of modules which operate when the substitute apparatus is in the activation state; and
a processor coupled to the memory and the processor configured to:
determine a current operation state of the information processing apparatus in the activation state;
identify one permission time corresponding to the current operation state from among the first information;
determine stop modules among the plurality of modules such that a total time for activating the stop modules is equal to or less than the one permission time based on the second information, the stop modules being modules to be stopped; and
instruct the substitute apparatus in the standby state to stop the stop modules.

2. The information processing apparatus according to claim 1, wherein
the memory is configured to store third information with respect to each of the plurality of modules, the third information including power consumption of a module in operation, and
the processor is configured to exclude a low-power module from the determined stop modules based on the third information, the low-power module being a module of which power consumption is equal to or less than a predetermined threshold value.

3. The information processing apparatus according to claim 1, wherein
the processor is configured to delay timing of instructing the substitute apparatus to stop the determined stop modules by a predetermined time when there is a module, which currently operates in the substitute apparatus, among the determined stop modules.

4. The information processing apparatus according to claim 1, wherein
the permission time included in the first information is set based on an upper limit time for which the information processing apparatus is capable of stopping the processing to be taken over by the substitute apparatus.

5. The information processing apparatus according to claim 1, wherein
the plurality of operation states include a first state in which the information processing apparatus permits reception of a processing request from another device and a second state in which the information processing apparatus stops the reception of the processing request.

6. The information processing apparatus according to claim 5, wherein
a permission time corresponding to the first state is shorter than a determination time for the other device to determine that the information processing apparatus is abnormal based on a response situation to the processing request after transmitting the processing request, and
a permission time corresponding to the second state is equal to or longer than the determination time.

7. An information processing system, comprising:
a first information processing apparatus; and
a second information processing apparatus configured to take over processing of the first information processing apparatus upon transitioning to an activation state;
wherein
the first information processing apparatus includes:
a memory configured to store first information and second information, the first information including a permission time with respect to each of a plurality of operation states of the first information processing apparatus in the activation state, the permission time being a time allowed for switching the second information processing apparatus from a standby state to the activation state, the second information being provided in the second information processing apparatus and including an activation time required for activating each of a plurality of modules which operate when the second information processing apparatus is in the activation state; and
a first processor coupled to the memory and the first processor configured to:
determine a current operation state of the first information processing apparatus in the activation state;
identify one permission time corresponding to the current operation state from among the first information;
determine stop modules among the plurality of modules such that a total time for activating the stop modules is equal to or less than the one permission time based on the second information, the stop modules being modules to be stopped; and
transmit a stop instruction to the second information processing apparatus in the standby state, the stop instruction instructing to stop the stop modules, and
the second information processing apparatus includes a second processor configured to:

control to stop the stop modules in accordance with the stop instruction; and activate the stop modules when the switching is started.

8. The information processing system according to claim 7, wherein the memory is configured to store third information with respect to each of the plurality of modules, the third information including power consumption of a module in operation, and the processor is configured to exclude a low-power module from the determined stop modules based on the third information, the low-power module being a module of which power consumption is equal to or less than a predetermined threshold value.

9. The information processing system according to claim 7, wherein the processor is configured to delay timing of instructing the second information processing apparatus to stop the determined stop modules by a predetermined time when there is a module, which currently operates in the second information processing apparatus, among the determined stop modules.

10. The information processing system according to claim 7, wherein the permission time included in the first information is set based on an upper limit time for which the first information processing apparatus is capable of stopping the processing to be taken over by the second information processing apparatus.

11. The information processing system according to claim 7, wherein the plurality of operation states include a first state in which the first information processing apparatus permits reception of a processing request from another device and a second state in which the first information processing apparatus stops the reception of the processing request.

12. The information processing system according to claim 11, wherein a permission time corresponding to the first state is shorter than a determination time for the other device to determine that the first information processing apparatus is abnormal based on a response situation to the processing request after transmitting the processing request, and a permission time corresponding to the second state is equal to or longer than the determination time.

13. A non-transitory computer-readable recording medium having stored therein a program that causes a computer to execute a process, the process comprising:

determining a current operation state of the computer in an activation state;

identify one permission time corresponding to the current operation state from among first information including a permission time with respect to each of a plurality of operation states of the computer in the activation state, the permission time being a time allowed for switching a substitute computer from a standby state to the activation state, the substitute computer taking over processing of the computer upon transitioning to the activation state;

determine stop modules, among a plurality of modules which operate when the substitute computer is in the activation state, such that a total time for activating the stop modules is equal to or less than the one permission time based on second information provided in the substitute computer, the stop modules being modules to be stopped, the second information including an activation time required for activating each of a plurality of modules which operate when the substitute computer is in the activation state; and instruct the substitute computer in the standby state to stop the stop modules.

* * * * *